(12) United States Patent
Okuda (10) Patent No.: US 8,633,989 B2
(45) Date of Patent: Jan. 21, 2014

(54) 3D CAMERA PHONE

(75) Inventor: Tetsuya Okuda, Foster City, CA (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 38 days.

(21) Appl. No.: 13/386,518

(22) PCT Filed: Dec. 16, 2010

(86) PCT No.: PCT/US2010/060721
§ 371 (c)(1),
(2), (4) Date: Jan. 23, 2012

(87) PCT Pub. No.: WO2012/082124
PCT Pub. Date: Jun. 21, 2012

(65) Prior Publication Data
US 2012/0270598 A1    Oct. 25, 2012

(51) Int. Cl.
*H04M 1/00* (2006.01)
*H04N 5/225* (2006.01)
*H04N 13/02* (2006.01)

(52) U.S. Cl.
USPC ............... 348/207.99; 455/556.1; 455/575.3; 348/47; 348/373

(58) Field of Classification Search
USPC ............ 455/41.1–41.2, 552.1, 556.1, 557, 455/575.1, 575.3, 90.2, 66.1; 348/14.2, 42, 348/46–48, 373–376; 396/325
See application file for complete search history.

(56) References Cited

U.S. PATENT DOCUMENTS

| | | | |
|---|---|---|---|
| 7,126,626 B2 * | 10/2006 | Sawahara et al. | 348/14.02 |
| 7,397,511 B2 * | 7/2008 | Ezawa | 348/373 |
| 2004/0218070 A1 * | 11/2004 | Hamalainen | 348/239 |
| 2007/0147827 A1 * | 6/2007 | Sheynman et al. | 396/325 |
| 2008/0024596 A1 * | 1/2008 | Li et al. | 348/47 |
| 2008/0170806 A1 * | 7/2008 | Kim | 382/285 |
| 2009/0148149 A1 * | 6/2009 | Chishima | 396/326 |
| 2010/0194860 A1 * | 8/2010 | Mentz et al. | 348/47 |
| 2010/0227650 A1 * | 9/2010 | Kim et al. | 455/566 |
| 2011/0117958 A1 * | 5/2011 | Kim et al. | 455/556.1 |
| 2012/0002958 A1 * | 1/2012 | Muukki | 396/325 |
| 2012/0149432 A1 * | 6/2012 | Lablans | 455/556.1 |

FOREIGN PATENT DOCUMENTS

| | | |
|---|---|---|
| EP | 1447995 A2 | 8/2004 |
| JP | 2002295445 A | 10/2002 |
| JP | 2003051872 A | 2/2003 |
| JP | 2004235926 A | 8/2004 |
| WO | 2006079963 A2 | 8/2006 |

OTHER PUBLICATIONS

International Search Report in re International Application No. PCT/US2010/060721 filed Dec. 16, 2010.

* cited by examiner

*Primary Examiner* — Simon Nguyen
(74) *Attorney, Agent, or Firm* — Coats & Bennett, P.L.L.C.

(57) ABSTRACT

A 3D camera or camera phone capable of producing 3D or stereoscopic images includes a normal mode for creating 3D images of relatively far away objects and a macro mode for creating 3D images of relatively close objects. In one embodiment, the invention is a 3D camera system comprising first and second camera modules. The second camera module is movable relative to the first camera module between a first imaging position wherein the optical axes of the first and second camera modules are parallel and facing in the same direction, and a second imaging position wherein the optical axes of the first and second camera modules are converging.

18 Claims, 6 Drawing Sheets

3D CAMERA PHONE

RELATED APPLICATION

This application claims priority to the International Patent Application identified by serial number PCT/US2010/060721 filed on Dec. 16, 2010, the entire contents of which are incorporated herein by reference.

BACKGROUND

The present invention relates generally to a 3D camera for recording 3D images and, more particularly, to a stereoscopic camera having a macro mode for recording 3D images of close objects.

The basic techniques for generating 3D or stereoscopic images have been well known for more than 100 years. A 3D or stereoscopic image comprises two images, the left eye image and right eye image, taken of the same scene or object from slightly different perspectives. The two images are captured by two different cameras offset by the average distance between the eyes of a human being. The images captured from two different cameras can then be superimposed on the same screen or display and viewed with special glasses including polarizing lenses or filters so that each eye views one of the images.

Recently, stereoscopic cameras and displays have been developed for small, portable devices, such as handheld game consoles and camera phones. The stereoscopic cameras are designed to record images of objects several meters in front of the camera in order to produce 3D or stereoscopic images. The 3D displays enable viewing of the 3D images without special glasses or filters. To create 3D images, the object recording must be captured by both cameras. One problem with current 3D cameras is the inability to capture images of objects close to the 3D camera. 3D camera systems are designed to capture images of objects several meters away. Accordingly, there is a need for a stereoscopic or 3D camera system for small portable devices that enables a macro mode for creating 3D images of close objects.

SUMMARY

The present invention relates to a 3D or stereoscopic camera or camera phone having a normal mode for creating 3D images of objects or scenes relatively far away, and a macro mode for creating 3D images of relatively close objects or scenes. The macro mode is enabled by changing the relative angle between the optical axes of first and second camera modules.

Exemplary embodiments of the invention comprise a 3D camera system for a mobile communication device. In one exemplary embodiment, the 3D camera system comprises a first camera module disposed on the mobile communication device, and a second camera module disposed on the mobile communication device. The second camera module is movable relative to the first camera module between a first imaging position wherein the optical axes of the first and second camera modules are parallel, and a second imaging position wherein the optical axes of the first and second camera modules are converging.

In some embodiments of the 3D camera system, the second camera module pivots about an axis between the first and second positions.

In some embodiments of the 3D camera system, the system comprises one or more sensors to detect a relative angle between the optical axes of the first and second camera modules.

In some embodiments of the 3D camera system, the first camera module is disposed on a first section of the mobile communication device and the second camera module is disposed on a second section of the mobile communication device pivotally connected to the first section.

In some embodiments of the 3D camera system, the first camera module is disposed on an end of the first section and the second camera module is disposed on a back of the second section.

In some embodiments of the 3D camera system, the first camera module is disposed on a first section of the mobile communication device and the second camera module second section is pivotally connected to a second section of the mobile communication device.

In some embodiments of the 3D camera system, the first camera module is disposed on a first section of the mobile communication device and the second camera module second section is pivotally connected to the first section of the mobile communication device.

In another embodiment of the present invention, a mobile communication device comprises a first camera module disposed on a first section of said mobile communication device, and a second camera module disposed on a second section of the mobile communication device. The second section is pivotally connected to the first section so as to be movable between a first imaging position wherein the optical axes of the first and second camera modules are parallel, and a second imaging position wherein the optical axes of the first and second camera modules are converging.

In some embodiments of the mobile communication device, the first camera module is disposed on an end of the first housing section and the second camera module is disposed on a back surface of the second section.

In some embodiments of the mobile communication device, the second camera module is pivotally connected to the second housing section.

In some embodiments of the mobile communication device, the first camera module is disposed on a first surface of the mobile communication device and the second camera module is pivotally connected to the first surface.

In some embodiments of the mobile communication device, the device comprises one or more sensors to detect a relative angle between the optical axes of the first and second camera modules.

DETAILED DESCRIPTION

The present invention is a 3D camera phone that is capable of producing 3D or stereoscopic images. The 3D camera phone includes a normal mode for creating 3D images of relatively faraway objects and a macro mode for creating 3D images of relatively close objects.

Figure 1:
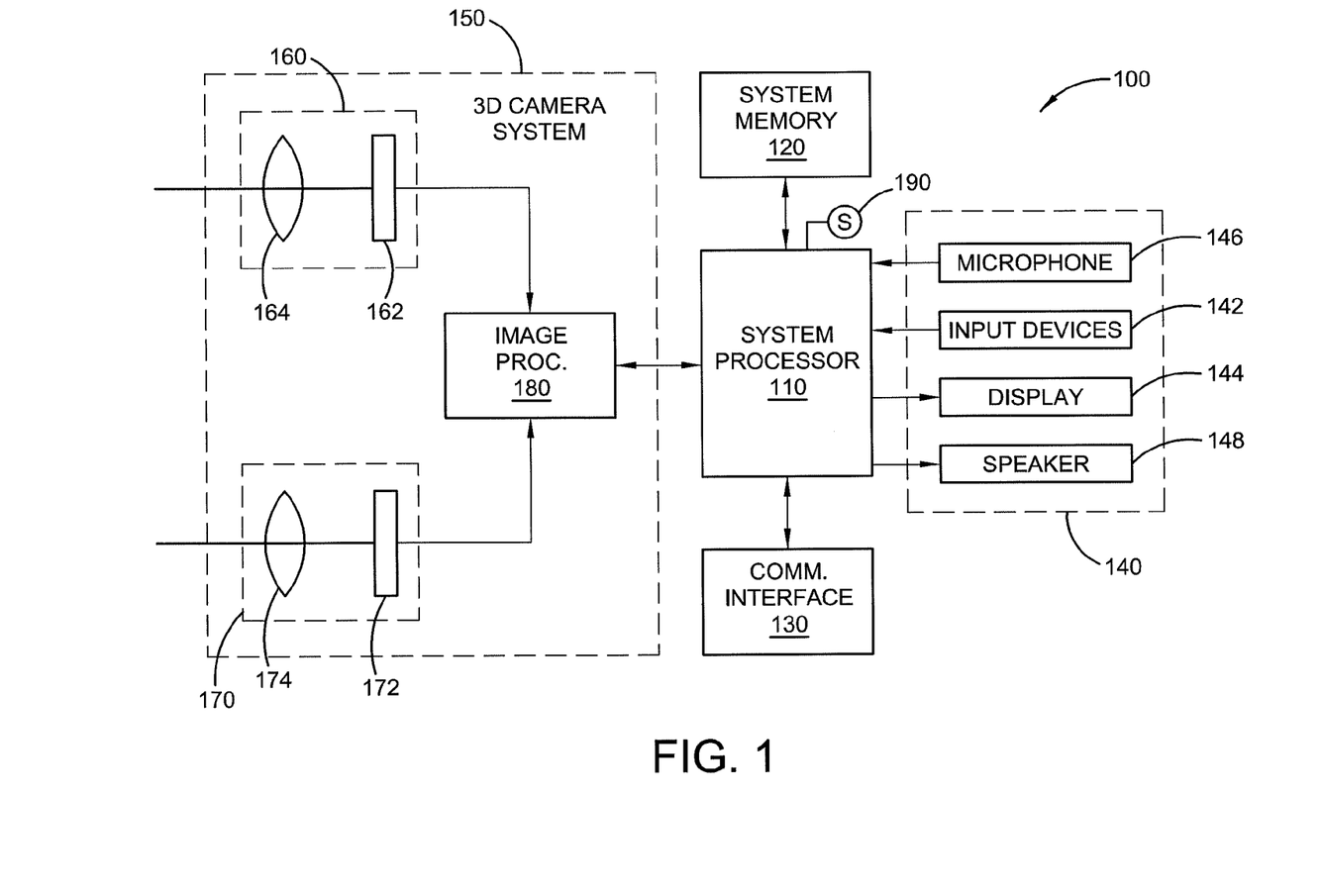
FIG. 1 is a block diagram illustrating the main functional components of the 3D camera phone.

FIG. 1 illustrates the main functional components of the 3D camera phone 100. The camera phone 100 includes main processor 110, memory 120, wireless communication interface 130, user interface 140, and a camera system 150. The main processor 110 controls the overall operation of the camera phone 100 according to program instructions stored in memory 120. Memory 120 comprises non-volatile memory, such as a read-only memory, for storing program instructions and data needs for operation, and volatile memory, such as random access memory, for storing temporary data required to carry out its operations. Wireless communication interface 130 enables communication with remote devices and may, for example, comprise a standard cellular transceiver or short-range wireless interface. The cellular transceiver may operate according to known standards, such as GSM, WCDMA, and LTE. The short-range interface may, for example, comprise a Bluetooth interface or wireless local area network (WLAN) interface.

The user interface 140 comprises one or more user input devices 142, a display 144, microphone 146, and speaker 148. The user input devices 142 may comprise a keypad, touchpad, function keys, scroll wheel, or other type of computer input device. The display 144 may comprise a conventional liquid crystal display (LCD) or touch screen display which also functions as a user input device. The microphone 146 converts acoustic signals to electrical audio signals for input to the processor 110. Speakers 148 convert electrical audio signals output by the processor 110 into acoustic signals that may be heard by the user.

The 3D camera system 150 comprises a first camera module 160, second camera module 170, and image processor 180. The first camera module 160 includes a first image sensor 162 and lens assembly 164. The second camera module 170 comprises a second image sensor 172 and lens assembly 174. The lens assemblies 164, 174 focus light on the image sensor 162, 172. The image sensors 162, 172 convert the signals into electrical signals which are input to an image processor 180. Image sensor 162, 172 may be any conventional image sensor, such as a charge-coupled device (CCD) or a complementary metal oxide semiconductor (CMOS) image sensor. Image processor 180 processes raw image data captured by image sensors 162, 172 for subsequent storage in a memory 120, output to display 144, and/or for transmission by communication interface 130. The image processor 180 may be independent from the main processor 110 or, alternatively, may be combined with the main processor 110. In some embodiments, the main processor 110 may function as an image processor with the aid of a digital signal processor or specialized image processing hardware. In some embodiments, one or more sensors 190 may be provided to detect the relative angle of the optical axes of the camera modules as hereinafter described.

Figure 2:
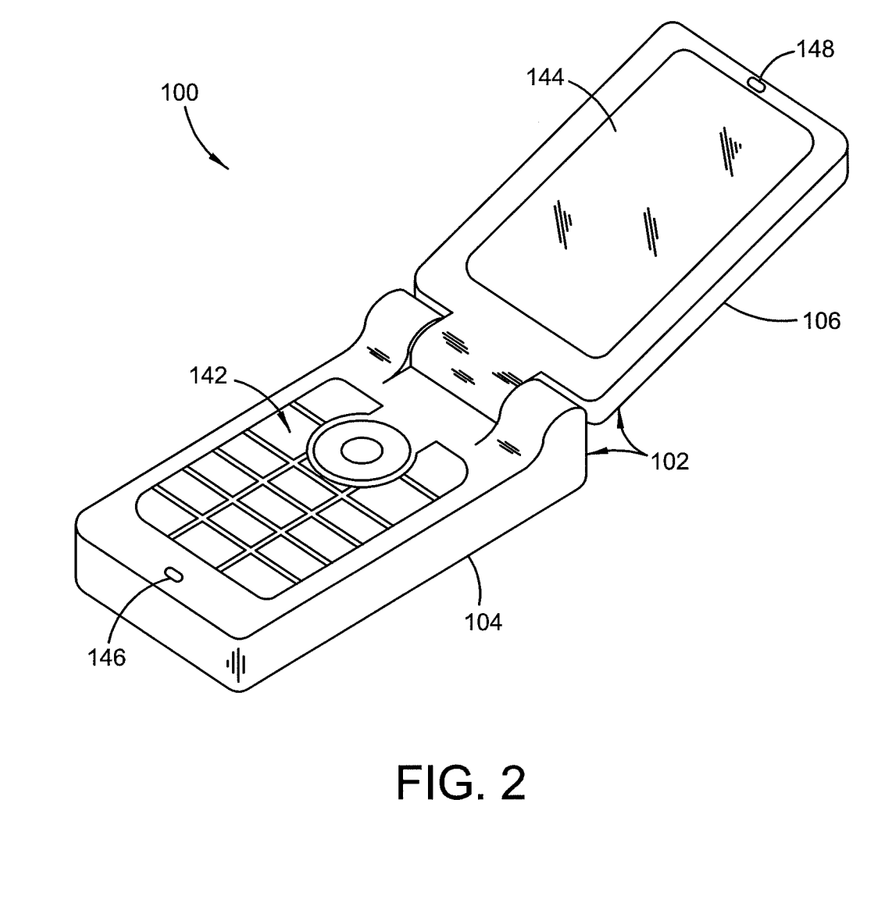
FIG. 2 is a perspective view of a clamshell-type 3D camera phone in an open position.
Figure 3:
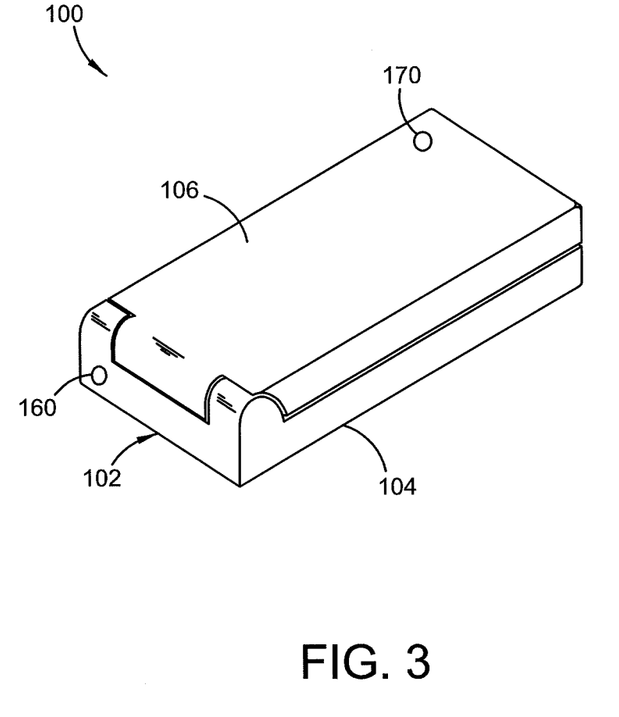
FIG. 3 is a perspective view of a clamshell-type 3D camera phone in a closed position.

FIGS. 2 and 3 illustrate the physical appearance of an exemplary camera phone 100 according to one embodiment. The camera phone 100 comprises a clamshell-type housing 102 including a first section 104 and a second section 106. The first and second sections 104, 106 are connected by a hinge 108 so that the second section 106 is movable relative to the first section 104 between closed and open positions. The hinge 108 may include detents to position the second section 106 at predetermined angular positions relative to the first section 104. FIG. 2 illustrates the second section 106 in an open position and FIG. 3 illustrates the second section in a closed position. In the exemplary embodiment, a keypad or other user input device 142 and microphone 146 are disposed on a front surface of the first section 104. The display 144 and speaker 148 are disposed on a front surface of the second section 106.

As seen in FIG. 3, a first camera module is disposed on one end of the first section 104. The second camera module 170 is disposed on a back surface of the second section 106. By disposing the camera modules 160, 170 on sections 104, 106 that are relatively movable, the user can vary the relative angle between the optical axis of the first and second camera modules 160, 170. More particularly, the second section 106 is movable from a first position for a normal 3D camera mode where the optical axes of camera modules 160, 170 are parallel, to a second position for a macro mode wherein the optical axes of the camera modules are converging. As previously noted, the second section is also movable to a closed position as shown in FIG. 3.

Figure 4:
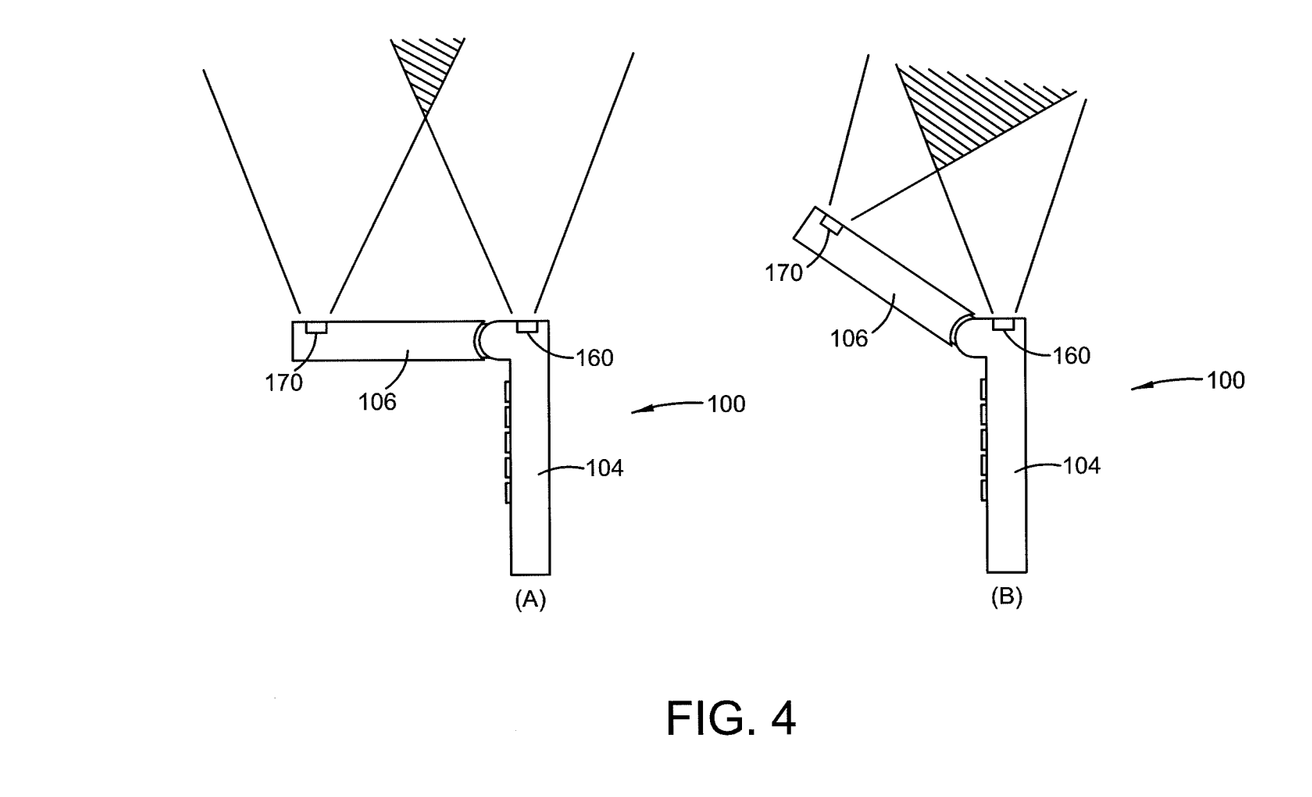
FIG. 4 is a schematic drawing of the clamshell-type 3D camera phone in a normal mode (A) and a macro mode (B).

FIG. 4 illustrates the camera phone 110 in a normal mode (A) and a macro mode (B). As previously noted, the hinge 108 may include detents or other positioning mechanism to position the second section 106 in the normal and macro positions, or other position, e.g., fully open position (not shown). In the normal mode (A), the second section 106 is disposed generally perpendicular to the first section 104. As previously noted, camera module 160 is disposed on an end of the first section 104, and camera module 170 is disposed on a back surface of the second section 106. In this position, the optical axes of the first and second camera modules 160, 170 are parallel, and the fields of view of the camera modules 160, 170 intersect at a distance relatively far away, e.g., several feet or more. In the macro mode (B), the second section 106 is rotated beyond the perpendicular position so that the optical axes of the first and second camera modules 160, 170 converge. In this case, the area encompassed by the field of view of both camera modules 160, 170 is moved closer to the camera. Thus, varying the angle of the optical axis between the first and second camera modules 160, 170 enables 3D imaging for objects that are relatively close as compared to the normal mode (A).

Figure 5:
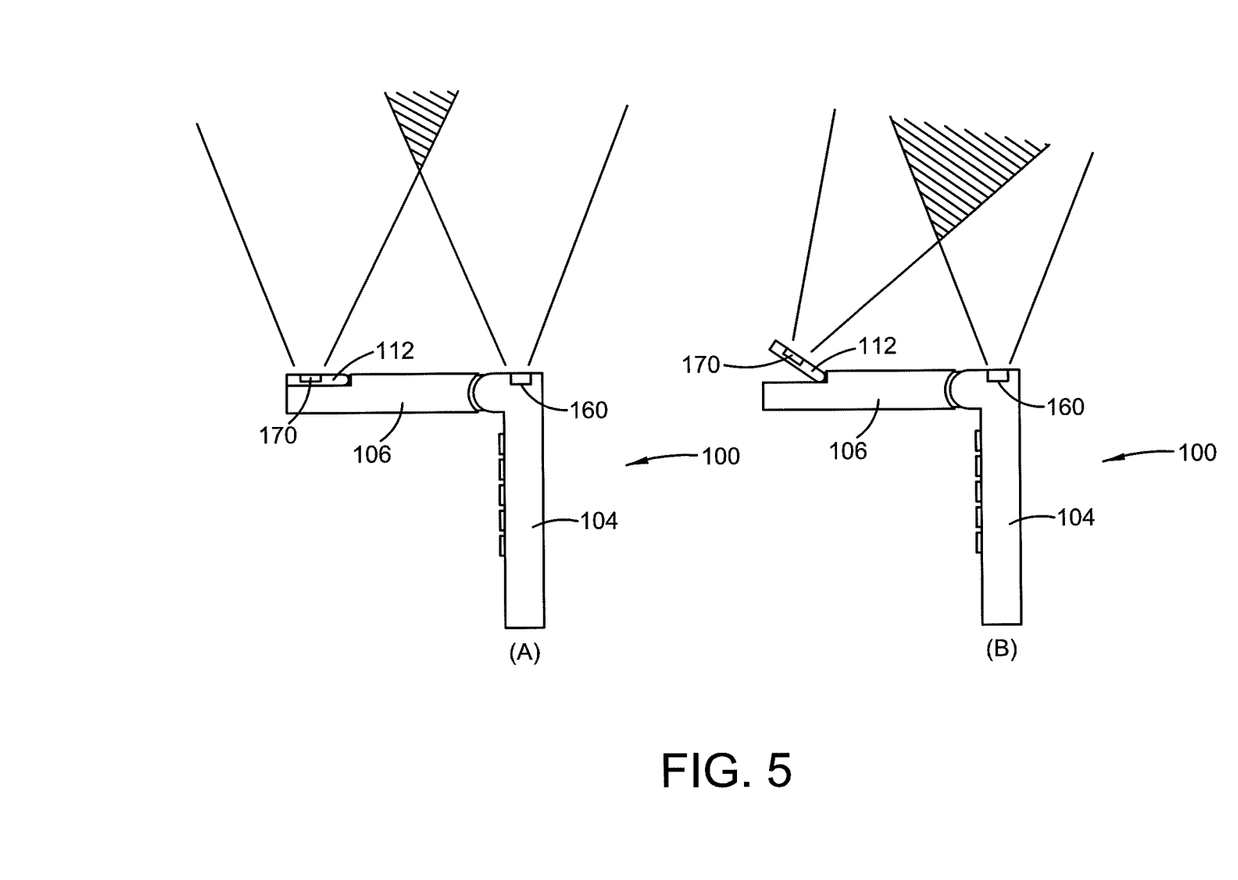
FIG. 5 illustrates an alternate embodiment of the clamshell-type 3D camera phone in a normal mode (A) and a macro mode (B).

FIG. 5 illustrates an alternate embodiment for varying the angle of the optical axis between the first and second camera modules 160, 170. In the embodiment shown in FIG. 5, the second camera module 170 is disposed on a panel 112 that pivots relative to the second section 106 of the housing 102. The panel 112 may be connected by a hinge (not shown) to the second section 106. In the normal mode (A), the panel 112 is disposed flat against the second section 106 so that the optical axes of the camera modules 160, 170 are parallel. In the macro mode (B), the second section 106 remains in the same position; however, the panel 112 rotates away from the second section 106. In this configuration, the optical axes of the first and second camera modules 160, 170 converge.

Figure 6:
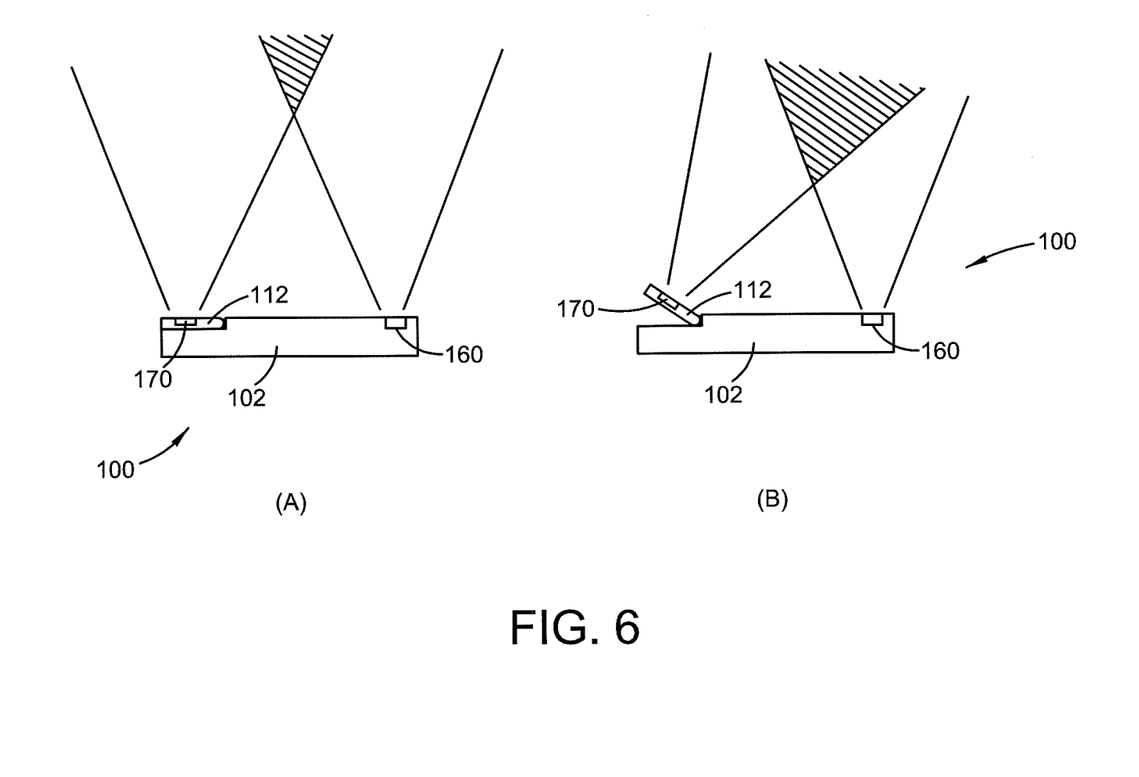
FIG. 6 is a schematic diagram of a stick-type camera phone in a normal mode (A) and a macro mode (B).

FIG. 6 shows an arrangement for a stick-type camera phone 100. In this embodiment, the first camera module 160 is disposed on a front surface of the housing 102. The second camera module 170 is disposed on a movable panel 112 pivotally attached to front surface of the housing 102. The panel 112 may be connected by a hinge (not shown) to the housing 102. In the normal mode (A), the movable panel 112 lies flat against the housing 102 so that the optical axis of the camera modules 160, 170 are parallel. In the macro mode (B), the movable panel 112 rotates away from the housing 102 so that the optical axes of the camera modules 160, 170 are converging. As previously noted, the converging axes moves the field covered by both the first and second camera modules 160, 170 closer to the camera phone 100.

In some embodiments of the invention, a sensor or transducer 190 (FIG. 1) may be used to detect the relative angle of the camera modules 160, 170 and vary the manner in which the image processor 180 processes captured images. For example, an angle sensor or accelerometer 190 can be used to detect the position of the second section 106 relative to the first section 104, or to detect the angular position of the panel 112. The system processor 110 and/or image processor 180 can use the information from the sensor 109 to determine the relative angle of the optical axes for the first and second camera modules 160, 170. When the optical axes are converging, a deskewing algorithm may be needed to process the image from one or both of the camera modules 160, 170.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A mobile communication device including a 3D camera system, said mobile communication device comprising:
    a first camera module disposed on the mobile communication device;
    a second camera module disposed on the mobile communication device, said second camera module being movable relative to the first camera module between a first imaging position wherein optical axes of the first and second camera modules are parallel and facing in the same direction, and a second imaging position wherein the optical axes of the first and second camera modules are converging;
    a first section of the mobile communication device that houses the first camera module and a second section of the mobile communication device that houses the second camera module, the first and second sections being pivotally connected at a hinge and movable relative to one another between a closed position with the sections folded together in an overlapping arrangement and a non-folded open position;
    the hinge being positioned between the first and second camera modules in each of the open and closed positions;
    the optical axes of the first and second camera modules being non-parallel in the closed position.

2. The 3D camera system of claim 1 wherein the second camera module pivots about an axis between the first and second positions.

3. The 3D camera system of claim 2 further comprising one or more sensors to detect a relative angle between the optical axes of the first and second camera modules.

4. The 3D camera system of claim 2 wherein the first camera module is disposed on the first section of the mobile communication device and the second section includes a panel that is pivotally connected to a main body of the second section with the second camera module positioned on the panel.

5. The 3D camera system of claim 2 wherein the first camera module is disposed on an end of the first section and the second camera module is disposed on a back of the second section.

6. The 3D camera system of claim 2 wherein the first camera module is disposed on the first section of the mobile communication device and the second camera module is pivotally connected to the second section of the mobile communication device.

7. A mobile communication device including a 3D camera system, said mobile communication device comprising:
    a first camera module disposed on a first section of said mobile communication device;
    a second camera module disposed on a second section of the mobile communication device that is pivotally connected to said first section so as to be movable between a first imaging position wherein optical axes of the first and second camera modules are parallel and facing in the same direction, and a second imaging position wherein the optical axes of the first and second camera modules are converging;
    the first and second sections movable about the hinge from the imaging positions to a closed position in which the first and second sections are arranged in an overlapping orientation, the optical axes being perpendicular in the closed orientation.

8. The mobile communication device of claim 7 wherein the first camera module is disposed on an end of the first housing section and the second camera module is disposed on a back surface of the second section.

9. The mobile communication device of claim 7 wherein the second camera module is pivotally connected to the second housing section.

10. The mobile communication device of claim 7 wherein the first camera module is disposed on a first surface of the mobile communication device and the second camera module is pivotally connected to the first surface.

11. The mobile communication device of claim 7 further comprising one or more sensors to detect a relative angle between the optical axes of the first and second camera modules.

12. A mobile communication device including a 3D camera system, said mobile communication device comprising:
    first and second sections each including opposing front and back faces, and first and second longitudinal end faces that extend between the front and back faces;
    a hinge pivotally connecting the first and second sections with the sections movable between a closed position with the sections in an overlapping orientation and the front faces facing together, and an open position with the front faces being exposed;
    a first camera module disposed on the first longitudinal end of the first section and a second camera module disposed on the back face of the second section, each of the camera modules including an optical axis;
    the first and second sections being movable about the hinge to the open position with the first and second camera modules facing in a common direction and the optical axes converging.

13. The mobile communication device of claim 12 wherein the first and second sections are further movable to another open position with the optical axes of the first and second camera modules being parallel and facing in the common direction.

14. The mobile communication device of claim 13 wherein the first and second sections are perpendicular in the another open position.

15. The mobile communication device of claim 12 wherein the hinge is positioned between the first and second camera modules in each of the open and closed positions.

16. The mobile communication device of claim 12 wherein the second section further includes a panel that is pivotally connected to a main body, the second camera module being positioned on the panel.

17. The mobile communication device of claim 16 further comprising input keys positioned on the front face of the first section and a display positioned on the front face of the second section.

18. The mobile communication device of claim 12 wherein the optical axes of the first and second camera modules are perpendicular in the closed position.

\* \* \* \* \*